United States Patent [19]
Fay et al.

[11] Patent Number: 5,289,879
[45] Date of Patent: Mar. 1, 1994

[54] SANDTRAP MAINTENANCE MACHINE RAKE ASSEMBLY

[75] Inventors: Malachy Fay; Helmut J. Ullrich, both of Eden Prairie, Minn.

[73] Assignee: The Toro Company, Minneapolis, Minn.

[21] Appl. No.: 961,765

[22] Filed: Oct. 15, 1992

[51] Int. Cl.$^5$ .................. A01B 13/00; A01B 49/02
[52] U.S. Cl. .................. 172/197; 172/684.5
[58] Field of Search ............ 172/197, 198, 199, 200, 172/684.5, 799.5; 56/1

[56] References Cited

U.S. PATENT DOCUMENTS

| | | | |
|---|---|---|---|
| 640,514 | 1/1900 | Ernst | 172/197 |
| 977,051 | 11/1910 | Stovall | 172/197 |
| 3,613,802 | 10/1971 | Carlson | 172/620 X |
| 3,823,781 | 7/1974 | Check | 172/200 X |

FOREIGN PATENT DOCUMENTS 24482  4/1919  Denmark ............ 172/197

OTHER PUBLICATIONS

Toro Sand Pro ® 14 Brochure dated 1989.
Operator's Manual and Parts List for the Olathe Model 242 Finishing Rake Assembly (undated).
Parts Drawing for Smithco Rake Assembly (undated).

*Primary Examiner*—David J. Bagnell
*Attorney, Agent, or Firm*—James W. Miller

[57] ABSTRACT

An improved rake assembly for a sandtrap maintenance machine comprises a rake frame having a transverse row or rows of scarifying teeth. A trowel plate is fixed to the rake frame and trails behind the scarifying teeth and includes a substantially planar lower edge comprising a horizontal flange that bears against the sand to smooth out the sand disturbed by the scarifying teeth. In addition, a finishing rake is moveably attached to the rake frame to trail behind both the scarifying teeth and the trowel plate to allow the finishing rake to further groom and smooth the surface of the sand. The trowel plate is adjustably carried on the rake frame to be capable of vertical adjustment up and down relative to the rake frame. This vertical adjustment allows the height of the scarifying teeth of the rake frame to be quickly adjusted without having to individually adjust the scarifying teeth one by one.

8 Claims, 1 Drawing Sheet

SANDTRAP MAINTENANCE MACHINE RAKE ASSEMBLY

TECHNICAL FIELD

This invention relates to a powered implement for grooming or smoothing sand in golf course sandtraps and the like and, more particularly, to an improved rake assembly for use with this implement.

BACKGROUND OF THE INVENTION

The Toro Company, the assignee of this invention, has long manufactured and sold various powered implements, known as Sand Pros ©, which are used on golf courses for grooming and smoothing the sand found in the sandtraps. A typical eighteen hole golf course will have a substantial amount of area covered by the sandtraps. Accordingly, a machine like the Sand Pro ©, which is powered and carries an operator so as to be driven over the surface of the sandtraps, greatly eases the task of grooming and smoothing the sand. The Sand Pro © includes a wheeled traction unit specifically designed for traveling over a sand surface without bogging down in the sand.

The traction unit of the Sand Pro © tows a rake assembly which works the sand to groom and smooth it. The rake assembly previously sold by Toro consists of a plurality of planar finishing rakes each having a serrated lower edge. The finishing rakes are located in two transverse rows that extend across the width of the machine with the individual rakes in each row being transversely spaced apart from the adjacent rakes in that same row. The rakes in the rear row are transversely staggered relative to the rakes in the front row to span the gaps between the rakes in the front row so that the entire swath of sand encountered by the rake assembly is groomed and smoothed without leaving any ungroomed windrows. The finishing rakes are suspended from a frame of the rake assembly so that in a working position of the rake assembly so that in a finishing rakes simply causes them to drag along in the sand with their serrated lower edges grooming and smoothing the sand as the traction unit moves forward.

More recently, a different rake assembly has been offered by Smithco for use on Sand Pro © type machines. The Smithco rake assembly is similar to the Toro rake assembly described above as it includes a plurality of finishing rakes having serrated lower edges. However, the Smithco rake assembly also includes a plurality of downwardly extending, prong type scarifying teeth and one or more trowel plates located on the rake frame in advance of the finishing rakes. Each trowel plate is fixed to the rake frame to be located between the scarifying teeth and the finishing rakes. Each trowel plate includes a smooth lower edge, comprised of a horizontal flange, for contacting and smoothing the sand.

The scarifying teeth used on the Smithco rake assembly comprise bolts or pins that include a threaded upper end which is fixed to the rake frame by tightening various attachment nut(s). One difficulty with the Smithco rake assembly is that vertical adjustment of the scarifying teeth is made purely by adjusting each individual scarifying tooth up or down relative to the rake frame. This means that the attachment nut(s) for each tooth have to be loosened, the tooth has to be moved up or down a desired amount, and then the attachment nut(s) have to be retightened while the tooth is held in its adjusted position. Because a large number of scarifying teeth are located on the rake frame, this becomes a laborious and time-consuming process. In addition, it is difficult to be entirely consistent in how far up or down all of the individual teeth have been adjusted. Thus, the lower ends of the scarifying teeth may end up being at slightly different elevations after an adjustment is made.

Another difficulty with the Smithco rake assembly is that the scarifying teeth quickly become covered with dirt and water in the outdoor environment in which these machines are designed to operate. Thus, the attachment nuts used to secure the scarifying teeth quickly become hard to loosen due to corrosion and similar factors. Coupled with the previously noted need to adjust each tooth individually, this has meant as a practical matter that the height of the scarifying teeth are not adjusted once they are initially set. It is simply too difficult and time-consuming to readjust the teeth. Thus, the operator tends to leave the teeth in their initial position where they were positioned when the rake assembly was originally set up and is not tempted to adjust these teeth even though, on occasion, that would be desirable, i.e. the conditions of the sand in the sandtraps would otherwise warrant adjusting how aggressively the teeth engage the sand.

SUMMARY OF THE INVENTION

It is one aspect of this invention to provide a rake assembly suited for grooming and smoothing sand or the like which includes a plurality of prong type scarifying teeth. More particularly, one aspect of this invention relates to a rake assembly in which the height of the scarifying teeth relative to the surface being groomed can be quickly and easily adjusted without individually adjusting each scarifying tooth.

These and other aspects of this invention are provided by a rake assembly which is suited to be attached to a traction unit such that the rake assembly can be towed through the material that is to be groomed. The rake assembly comprises a rake frame which in a working position is suspended from the traction unit by a suspension means for allowing the rake frame to engage the surface of the material by virtue of its own weight as the traction unit is driven forwardly. The rake frame comprises one or more downwardly extending scarifying teeth having upper ends fixed to the rake frame and lower ends extending downwardly therefrom to engage the surface of the material. One or more trowel plates are fixedly secured to the rake frame to trail behind the scarifying teeth taken with respect to the forward direction of movement of the traction unit. The trowel plates each include a lower edge suited to rest in engagement with the surface of the material when the rake frame is in its working position. The trowel plate is adjustably secured to the rake frame by attachment means to allow the trowel plate to be vertically adjusted relative to the rake frame such that the trowel plates themselves are used to adjust the height of the rake frame, and thus the height of the lower ends of the scarifying teeth, relative to the surface being groomed.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
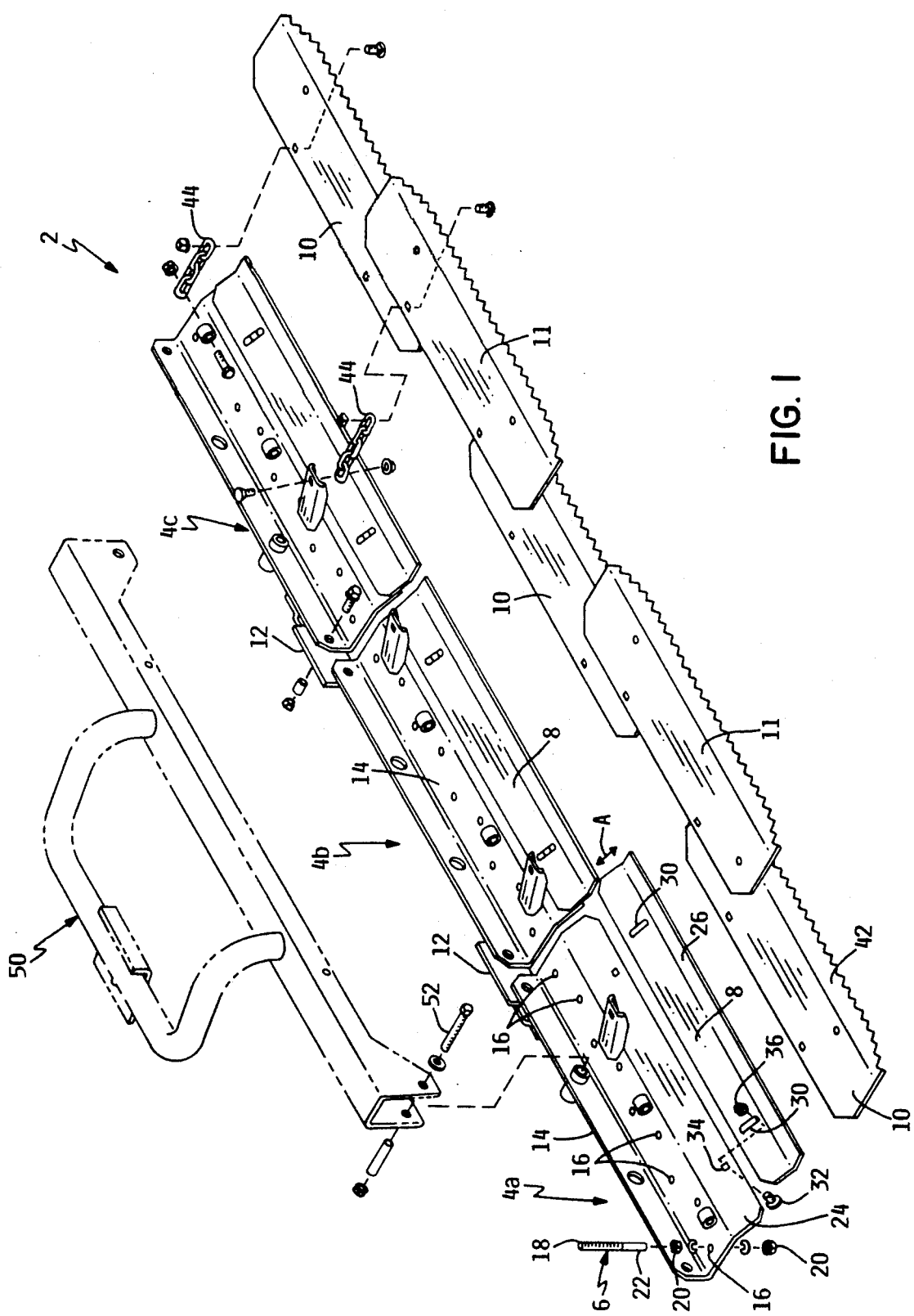
FIG. 1 is a perspective view of an improved rake assembly according to this invention, particularly illustrating the components thereof in an exploded form.

Referring to FIG. 1, an improved rake assembly according to this invention is illustrated generally as 2. Rake assembly 2 is suited to be attached to a Sand Pro © sandtrap maintenance machine of the type well known in the art. The Sand Pro © is manufactured and sold by The Toro Company and includes an operator driven, self-propelled, wheeled traction unit that is capable of being driven over the ground. Specifically, the Sand Pro © is equipped with balloon type tires to allow it to be driven over a sandy surface without sinking into the sand. When attached to the Sand Pro © traction unit, the purpose of rake assembly 2 is to groom and smooth the sand in the sandtraps of golf courses, beaches, and the like.

Rake assembly 2 of this invention may be built as a plurality of separate subassemblies 4 each of which are generally identical. Each subassembly 4 includes the following components: 1) a transverse array of scarifying teeth 6, 2) a trowel plate 8 which is fixed relative to scarifying teeth 6 so as to be immovable relative to teeth 6 during operation of rake assembly 2, and 3) a trailing finishing rake 10 which trails behind scarifying teeth 6 and trowel plate 8 and which is movable relative to these components so as to be able to drag on the sand. The construction and operation of a typical rake subassembly 4 will be described in more detail hereafter.

As shown in FIG. 1, three separate subassemblies 4 are shown comprising rake assembly 2, namely there is a lefthand rake subassembly 4a, a central rake subassembly 4b, and a righthand rake subassembly 4c. When multiple subassemblies 4 are used, they are disposed across the width of rake assembly 2 in a side-by-side manner and are secured together by attachment brackets 12 that are bolted to and extend between adjacent subassemblies 4. Moreover, additional finishing rakes 11 are positioned to trail behind finishing rakes 10 of subassemblies 4 with the additional finishing rakes 11 being staggered to span the gap between the rakes 10 of the subassemblies 4. This allows rake assembly 2 to smooth the sand over the entire width of rake assembly 2 without leaving any windrows of sand.

While a rake assembly 2 made from a plurality of side-by-side rake subassemblies 4 has been illustrated herein, this invention is not limited to a structure made from multiple subassemblies. This invention could comprise a rake assembly 2 consisting of only one subassembly 4.

Attention will now be turned to the construction of an individual rake subassembly 4. As subassemblies 4 are generally identical to one another, this description will apply equally to any of the subassemblies 4 except for any specific exceptions that might be noted.

Rake subassembly 4 includes a rake frame 14 having a set of transversely spaced holes 16 extending across the top thereof from one side of rake frame 14 to the other. A single scarifying tooth 6 extends downwardly through each hole 16. Tooth 6 forms a vertically extending prong and includes a threaded upper end 18. A set of jam nuts 20 (or a single attachment nut in the event tooth 6 is provided with an enlarged head to engage against the underside of rake frame 14) are received on the threaded upper end 18 of tooth 6 and are tightened against rake frame 14 to fixedly secure each tooth 6 to rake frame 14. When a plurality of teeth 6 are secured to rake frame 14 with one tooth 6 being received in each hole 16, a plurality of scarifying teeth 6 are provided in a transversely spaced array on rake frame 14. The lower ends 22 of these teeth 6 extend downwardly to engage the surface of the sand for digging or furrowing the sand up.

Rake frame 14 includes a trailing rear face 24 which is inclined at an angle relative to the horizontal. This trailing rear face 24 carries the trowel plate 8 thereon in a mating face-to-face relationship. Trowel plate 8 includes a lower edge comprising a substantially horizontal, planar ground engaging flange 26.

An important feature of this invention is to make trowel plate 8 vertically adjustable relative to rake frame 14. This is done by using elongated slots 30 in trowel plate 8 through which the stems of attachment bolts 32 extend. The head of each bolt 32 abuts on the underside of the trailing rear face 24 of rake frame 14 with the stem of bolt 32 passing upwardly through a hole 34 in rear face 24 and through slot 30 in trowel plate 8. When a nut 36 received on the stem of bolt 32 is firmly tightened against trowel plate 8, trowel plate 8 will be fixed in place relative to rake frame 14. However, the vertical position of trowel plate 8 relative to rake frame 14 can be adjusted by loosening nut 36 and sliding trowel plate 8 up and down on the trailing rear face 24 of rake frame 14 by virtue of the slotted engagement provided by slots 30. Note the adjustment arrows A in FIG. 1 which indicate the vertical adjustment of trowel plate 8.

Rake subassembly 4 also includes a trailing finishing rake 10 having a serrated rear edge 42. Finishing rake 10 is secured to rake frame 14 by a plurality of chains 44 extending between rake frame 14 and finishing rake 10. Thus, as rake frame 14 is moved forwardly over the ground, finishing rake 10 can simply drag on the sand being groomed and smoothed. Chains 44 provide a flexible attachment for finishing rake 10 to allow finishing rake 10 to move relatively to rake frame 14 to maintain contact with the sand at all times as rake assembly 2 is towed over the sandtrap.

Rake assembly 2 is secured to the Sand Pro © traction unit by any appropriate hitch means, illustrated generally as 50, which allows rake assembly 2 to be towed by the traction unit, but to otherwise simply rest on the surface being groomed by virtue of the weight of rake assembly 2 alone. In other words, rake assembly 2 is not positively forced by the hitch means into engagement with the sand, but is simply allowed to have a gravity engagement with the sand in the sandtrap. In this regard, any appropriate hitch means 50 that allows this result can be used. Hitch means 50 simply has to be secured by coupling members 52 to one or more of the rake subassemblies 4 that make up rake assembly 2.

A rake assembly 2 according to this invention is quite effective in grooming and smoothing sand in a sandtrap. In addition, rake assembly 2 is easily adjustable in terms of varying the vertical height of scarifying teeth 6 relative to the ground. Namely, it is quite easy to raise or lower the lower ends 22 of scarifying teeth 6 to allow them to be more or less aggressive in working or disturbing the surface of the sand. This is done simply by adjusting the height of trowel plates 8 relative to rake frame 14.

In this regard, if one wishes to raise scarifying teeth 6 relative to the surface being groomed, one first unbolts trowel plate 8 from rake frame 14 sufficiently to allow trowel plate 8 to be slid along the length of slot 30. One then simply lowers trowel plate 8 downwardly relative to rake frame 14 by sliding trowel plate 8 downwardly on the trailing rear face 24 of rake frame 14 until a new vertical position of trowel plate 8 is reached, and then bolt 32 is retightened to resecure trowel plate 8 to rake frame 14. Because the horizontal flange 26 comprising the lower edge of trowel plate 8 will stay in contact with the surface of the sand, lowering the trowel plate 8 on rake frame 14 has the effect of raising rake frame 14, and hence of raising scarifying teeth 6, relative to the surface being groomed. To lower scarifying teeth 6 relative to the surface being groomed, the reverse adjustment of trowel plate 8 is used, i.e. trowel plate 8 is raised relative to rake frame 14. The amount of the adjustment allowed for trowel plate 8 is set by the length of the slot.

The basic purpose in adjusting the vertical position of scarifying teeth 6 is to control how aggressively they dig into the sand surface. In experimenting with this type of rake assembly, the Applicants surprisingly found that the angle of trowel plate 8 relative to the surface being groomed was somewhat important in achieving the desired result. When the angle of inclination of trowel plate 8 relative to the horizontal was 45 degrees, it was found that raising or lowering trowel plate 8 gave an opposite result in terms of the aggressiveness of the action of scarifying teeth 6 to what was expected. In other words, with the angle of trowel plate 8 at 45 degrees, after lowering trowel plate 8, which should have produced a raising of rake frame 14 and less aggressive digging action by teeth 6, it was found that more sand was being accumulated in front of trowel plate 8 and being dragged forwardly.

Because this result is directly contrary to what the ordinary user would expect to happen, an adjustment was made until rake assembly 2 operated in the expected manner, i.e. lowering trowel plate 8 on rake frame 14 resulted in shallower digging of scarifying teeth 6 with less sand being disturbed and accumulated in front of trowel plate 8 and vise versa. This was accomplished by making the angle of inclination of trowel plate 8 shallower than 45 degrees, i.e. to be approximately 30 degrees. With trowel plate 8 inclined at 30 degrees relative to the horizontal, vertical adjustment of trowel plate 8 on rake frame 14 resulted in the expected adjustment of scarifying teeth, i.e. lowering trowel plate 8 made the teeth less aggressive and raising trowel plate 8 made the teeth more aggressive.

A major advantage of a rake assembly 2 according to this invention is the ease of adjusting the action of scarifying teeth 6. None of the scarifying teeth 6 have to be individually adjusted. There is no need to attempt to loosen and retighten all of the nuts 20 used to secure teeth 6 to rake frame 14. All that has to be done is to simply adjust the position of trowel plate 8 on rake frame 14 which can be quickly and easily done. Thus, the operator of rake assembly 2 will be encouraged to make the adjustments to teeth 6 that might be required by the grooming operations that are needed at a particular time since this adjustment is no longer the laborious and time consuming process that it was with the prior art rake assemblies.

The mating face-to-face engagement between the trailing rear face 24 of rake frame 14 and trowel plate 8 is also advantageous. It allows trowel plate 8 to be firmly supported over its entire length and provides a surface on which trowel plate 8 can be easily slid up and down.

Various modifications of this invention will be apparent to those skilled in the art. Thus, the scope of this invention is to be limited only by the appended claims.

We claim:

1. An improved rake assembly for connection to a powered traction unit to allow the rake assembly to be towed or pulled over a granular surface which is to be groomed by the rake assembly, which comprises:
   (a) a rake frame having means for connecting the rake frame to the traction unit, wherein the connecting means is configured to allow the rake frame to rest on the ground by virtue of its own weight as the traction unit is driven forwardly, wherein the rake frame includes a substantially planar trailing rear face which is inclined at an angle relative to the horizontal;
   (b) at least one scarifying tooth carried on the rake frame in advance of the trailing rear face thereof, wherein each scarifying tooth includes a lower end extending downwardly from the rake frame and adapted to contact the granular surface to disturb the granular surface;
   (c) a trowel plate fixed to the rake frame and extending downwardly to be located behind the scarifying teeth, the trowel plate being fixed to the rake frame during operation of the rake assembly so as to be non-moveable relative thereto and having a lower edge suited for engaging the surface to be groomed for smoothing the surface, and wherein the trowel plate has a mating face-to-face relationship with the planar trailing rear face of the rake frame over substantially the entire width of the trowel plate such that the trowel plate is firmly supported on the planar trailing rear face of the rake frame during operation of the rake assembly; and
   (d) means for connecting the trowel plate to the trailing rear face of the rake frame for adjustment in a vertical direction up and down relative to the trailing rear face of the rake frame to allow the height of the scarifying teeth relative to the surface to groomed to be adjusted by adjusting the position of the trowel plate on the trailing rear face of the rake frame.

2. A rake assembly as recited in claim 1, wherein the lower edge of the trowel plate comprises a substantially horizontal flange which rests on the granular surface and smooths the granular surface during forward motion of the rake assembly.

3. A rake assembly as recited in claim 1, wherein the lower edge of the trowel plate comprises a planar lower edge.

4. A rake assembly as recited in claim 1, wherein a plurality of scarifying teeth are carried on the rake frame.

5. A rake assembly as recited in claim 4, wherein the scarifying teeth are arranged in at least one row of transversely spaced teeth that extend across the rake frame from one side to the other.

6. An improved rake assembly for connection to a powered traction unit to allow the rake assembly to be towed or pulled over a granular surface which is to be groomed by the rake assembly, which comprises:
   (a) a rake frame having means for connecting the rake frame to the traction unit, wherein the connecting means is configured to allow the rake frame to rest on the ground by virtue of its own weight as the traction unit is driven forwardly;

(b) at least one scarifying tooth carried on the rake frame, wherein each scarifying tooth includes a lower end extending downwardly from the rake frame and adapted to contact the granular surface to disturb the granular surface;

(c) a trowel plate fixed to the rake frame and extending downwardly to be located behind the scarifying teeth, the trowel plate being fixed to the rake frame during operation of the rake assembly so as to be non-moveable relative thereto and having a lower edge suited for engaging the surface to be groomed for smoothing the surface; and (d) means for connecting the trowel plate to the rake frame for adjustment in a vertical direction up and down relative to the rake frame to allow the height of the scarifying teeth relative to the surface to be groomed to be adjusted by adjusting the position of the trowel plate on the rake frame, and wherein the trowel plate includes an inclined front face for connecting the trowel plate to the rake frame, wherein the inclined front face of the trowel plate is inclined at less than 45 degrees relative to the horizontal.

7. A rake assembly as recited in claim 6, wherein the front face of the trowel plate is inclined at approximately 30 degrees relative to the horizontal.

8. An improved rake assembly for connection to a powered traction unit to allow the rake assembly to be towed or pulled over a granular surface which is to be groomed by the rake assembly, which comprises:

(a) a rake frame having means for connecting the rake frame to the traction unit, wherein the connecting means is configured to allow the rake frame to rest one the ground by virtue of its own weight as the traction unit is driven forwardly;

(b) at least one scarifying tooth carried on the rake frame, wherein each scarifying tooth includes a lower end extending downwardly from the rake frame and adapted to contact the granular surface to disturb the granular surface;

(c) a trowel plate fixed to the rake frame and extending downwardly to be located behind the scarifying teeth, the trowel plate being fixed to the rake frame during operation of the rake assembly so as to be non-moveable relative thereto and having a lower edge suited for engaging the surface to be groomed for smoothing the surface;

(d) means for connecting the trowel plate to the rake frame for adjustment in a vertical direction up and down relative to the rake frame to allow the height of the scarifying teeth relative to the surface to be groomed to be adjusted by adjusting the position of the trowel plate on the rake frame; and (e) a finishing rake secured to the rake frame and trailing behind the trowel plate, the finishing rake having a serrated rear edge, and further including means for suspending the finishing rake from the rake frame to allow the finishing rake to drag behind the rake frame.

* * * * *